(12) United States Patent
Dragavon

(10) Patent No.: US 10,382,700 B1
(45) Date of Patent: Aug. 13, 2019

(54) OPTICAL MULTIPLEXING AND OVERLAID SUBPIXEL PROCESSING

(71) Applicant: RAYTHEON COMPANY, Waltham, MA (US)

(72) Inventor: Edward James Dragavon, Los Angeles, CA (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 16/152,253

(22) Filed: Oct. 4, 2018

(51) Int. Cl.
*H04N 5/232* (2006.01)
(52) U.S. Cl.
CPC ..... *H04N 5/23296* (2013.01); *H04N 5/23232* (2013.01)
(58) Field of Classification Search
CPC .......... H04N 5/23296; H04N 5/23232; H04N 1/3872
See application file for complete search history.

(56) References Cited

U.S. PATENT DOCUMENTS

| | | | |
|---|---|---|---|
| 9,013,590 B2 | 4/2015 | Richards | |
| 9,124,808 B2 | 9/2015 | Byren | |
| 10,070,055 B2* | 9/2018 | Shepard | H04N 5/2254 |
| 2017/0214861 A1* | 7/2017 | Rachlin | G03B 5/00 |
| 2018/0260649 A1 | 9/2018 | Kadambe et al. | |

FOREIGN PATENT DOCUMENTS

EP 2 590 399 A1 5/2013

OTHER PUBLICATIONS

Liutkus, Antoine et al., "Imaging With Nature: Compressive Imaging Using a Multiply Scattering Medium", Scientific Reports, Jul. 9, 2014, pp. 1-7, www.nature.com.
Shah, Vinay et al., "Shift-encoded optically multiplexed imaging", Optical Engineering, Apr. 2017, 15 pages, vol. 56, No. 4, SPIE.
Watts, Claire M. et al., "Frequency-division-multiplexed single-pixel imaging with metamaterials", Optica, Feb. 2, 2016, pp. 133-138, vol. 3, No. 2, Optical Society of America.
Zalevsky, Z. et al., "Chapter 6: Geometrical Superresolution", Optical Superresolution, 2004, pp. 183-208, Springer-Verlag New York, Inc.
Agaian, Sos S. et al., "Transform-Based Image Enhancement Algorithms with Performance Measure", IEEE Transactions on Image Processing, Mar. 2001, pp. 367-382, vol. 10, No. 3, IEEE.
Duarte, Marco F. et al., "Single-Pixel Imaging via Compressive Sampling", IEEE Signal Processing Magazine, Mar. 2008, pp. 83-91, IEEE.
Harwit, Martin et al., "Hadamard Transform Optics", 1979, pp. 30, 31, and 63, Academic Press.
Mahalanobis, A. et al., "Recent results of medium wave infrared compressive sensing", Applied Optics, Dec. 1, 2014, pp. 8060-8070, vol. 53, No. 34, Optical Society of America.

\* cited by examiner

*Primary Examiner* — Nicholas G Giles
(74) *Attorney, Agent, or Firm* — Lewis Roca Rothgerber Christie LLP

(57) ABSTRACT

An imaging system. In some embodiments, the system includes an image multiplexer, an imaging lens, a coded mask, an array detector comprising an array of pixels, and a processing circuit. The imaging lens and the image multiplexer are configured to superimpose a plurality of fields of view onto the array detector. The image multiplexer is controllable to shift each field of view by a respective image offset, and the coded mask is controllable to shade each of the pixels with a respective individual mask pattern.

17 Claims, 4 Drawing Sheets

OPTICAL MULTIPLEXING AND OVERLAID SUBPIXEL PROCESSING

FIELD

One or more aspects of embodiments according to the present invention relate to imaging systems, and more particularly to an imaging system providing a large total field of view and enhanced resolution.

BACKGROUND

An imaging system consisting of a lens and an array detector at the focus of the lens may have a field of view and an angular resolution defined by the focal length of the lens and the pixel pitch of the array detector. For example, a longer focal length may result in higher angular resolution (e.g., a larger number of pixels per unit angle in the scene) at the expense of a reduction in field of view. Conversely, a shorter focal length may result in an increase in the field of view at the expense of reduced angular resolution. Both a large field of view and high angular resolution may be beneficial in various military and commercial applications.

Thus, there is a need for an imaging system with both a large field of view and high angular resolution.

SUMMARY

According to some embodiments of the present disclosure there is provided a system, including: an image multiplexer; an imaging lens; a coded mask; an array detector including an array of pixels; and a processing circuit, the imaging lens and the image multiplexer being configured to superimpose a plurality of fields of view onto the array detector, the image multiplexer being controllable to shift each field of view by a respective image offset, and the coded mask being controllable to shade each of the pixels with a respective individual mask pattern.

In some embodiments, the coded mask is a Hadamard mask.

In some embodiments, the coded mask is immediately adjacent the array detector.

In some embodiments, the imaging lens is a compound lens and the coded mask is at an intermediate image plane of the imaging lens.

In some embodiments, the processing circuit is configured: in a first operation: to control the image multiplexer to produce a first combination of image offsets, to control the coded mask to shade a first pixel of the array of pixels with a first individual mask pattern, to acquire, from the array detector, a first image with the first combination of image offsets, and with the first individual mask pattern shading the first pixel; in a second operation: to control the image multiplexer to produce a second combination of image offsets, to control the coded mask to shade the first pixel with the first individual mask pattern, to acquire, from the array detector, a second image with the second combination of image offsets, and with the first individual mask pattern shading the first pixel; in a third operation: to control the image multiplexer to produce the first combination of image offsets, to control the coded mask to shade the first pixel with a second individual mask pattern, to acquire, from the array detector, a third image with the first combination of image offsets, and with the second individual mask pattern shading the first pixel; and in a fourth operation, to generate, from a plurality of images including the first image, the second image, and the third image, an enhanced-resolution image encompassing the plurality of fields of view.

In some embodiments, the coded mask is a Hadamard mask.

In some embodiments, the coded mask is immediately adjacent the array detector.

In some embodiments, the imaging lens is a compound lens and the coded mask is at an intermediate image plane of the imaging lens.

In some embodiments, the processing circuit is configured: to perform the first operation before the second operation; to perform the second operation before the third operation; and to perform the third operation before the fourth operation.

In some embodiments, the processing circuit is configured: to perform the second operation before the first operation; to perform the first operation before the third operation; and to perform the third operation before the fourth operation.

According to some embodiments of the present disclosure there is provided a method for forming images, the method including: acquiring, with an imaging system, a plurality of raw images including a first image, a second image, and a third image; generating, from the plurality of images, an enhanced-resolution image encompassing a plurality of fields of view, the imaging system including: an image multiplexer; an imaging lens; a coded mask; an array detector including an array of pixels; and a processing circuit, the imaging lens and the image multiplexer being configured to superimpose the plurality of fields of view onto the array detector, the image multiplexer being controllable to shift each field of view by a respective image offset, the coded mask being controllable to shade each of the pixels with a respective individual mask pattern, the acquiring the plurality of raw images including: in a first operation: controlling the image multiplexer to produce a first combination of image offsets, controlling the coded mask to shade a first pixel of the array of pixels with a first individual mask pattern, acquiring, from the array detector, a first image with the first combination of image offsets, and with the first individual mask pattern shading the first pixel; in a second operation: controlling the image multiplexer to produce a second combination of image offsets, controlling the coded mask to shade the first pixel with the first individual mask pattern, acquiring, from the array detector, a second image with the second combination of image offsets, and with the first individual mask pattern shading the first pixel; and in a third operation: controlling the image multiplexer to produce the first combination of image offsets, controlling the coded mask to shade the first pixel with a second individual mask pattern, acquiring, from the array detector, a third image with the first combination of image offsets, and with the second individual mask pattern shading the first pixel.

In some embodiments, the coded mask is a Hadamard mask.

In some embodiments, the coded mask is immediately adjacent the array detector.

In some embodiments, the imaging lens is a compound lens and the coded mask is at an intermediate image plane of the imaging lens.

In some embodiments, the first operation is performed before the second operation; the second operation is performed before the third operation; and the third operation is performed before the fourth operation.

In some embodiments, the second operation is performed before the first operation; the first operation is performed before the third operation; and the third operation is performed before the fourth operation.

According to some embodiments of the present disclosure there is provided a method for forming images using an imaging system having an image multiplexer, an imaging lens, a coded mask, an array detector with an array of pixels, and a processing circuit, the method including: acquiring, with the imaging system, a plurality of raw images including a first image, a second image, and a third image; generating, from the plurality of images, an enhanced-resolution image encompassing a plurality of fields of view; superimposing, using the imaging lens and the image multiplexer, the plurality of fields of view onto the array detector; using the processor, controlling the image multiplexer to shift each field of view by a respective image offset; using the processor, controlling the coded mask to shade each of the pixels with a respective individual mask pattern; and using the processor, generating, from the first image, the second image, and the third image, an enhanced-resolution image encompassing the plurality of fields of view.

BRIEF DESCRIPTION OF THE DRAWINGS

Features, aspects, and embodiments are described in conjunction with the attached drawings, in which.

DETAILED DESCRIPTION

The detailed description set forth below in connection with the appended drawings is intended as a description of exemplary embodiments of a system and method for optical multiplexing and overlaid subpixel processing provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the scope of the invention. As denoted elsewhere herein, like element numbers are intended to indicate like elements or features.

Figure 1:
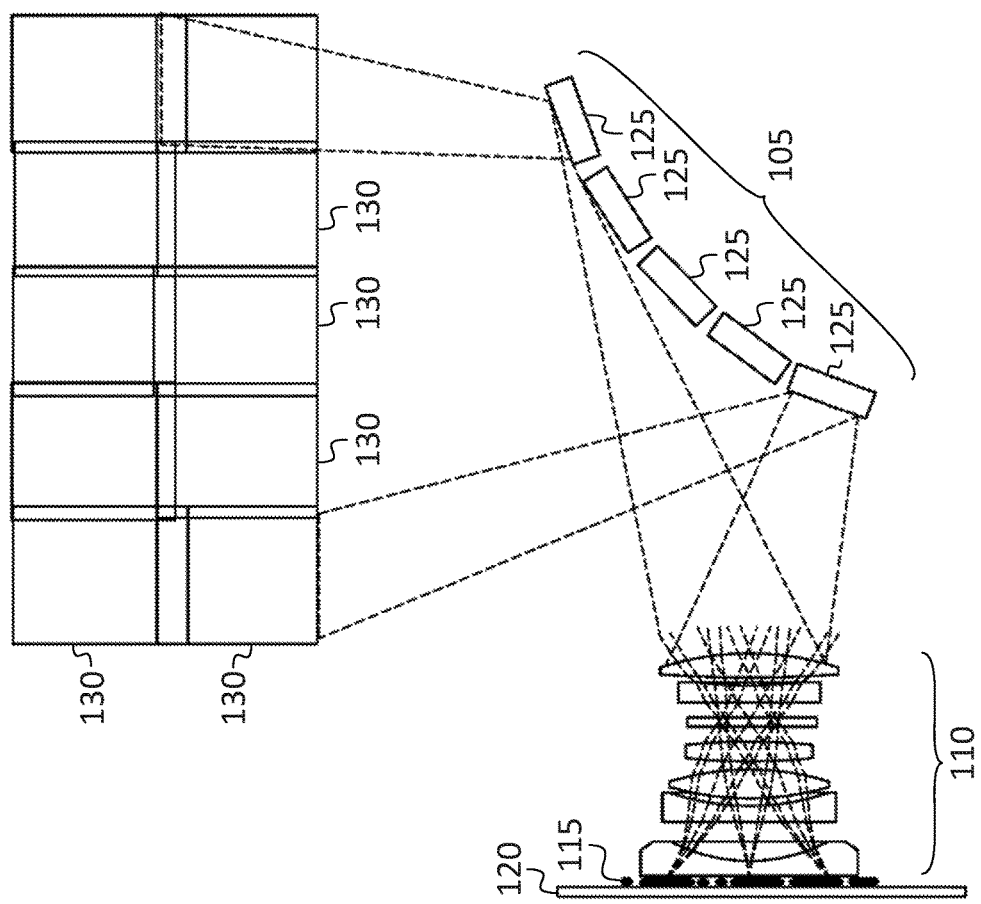
FIG. 1 is a schematic illustration of an imaging system, according to an embodiment of the present invention.

Referring to FIG. 1, in some embodiments, an imaging system includes an image multiplexer 105, a lens 110, a coded mask 115, and an array detector 120. The array detector 120 may include a plurality of pixels arranged in a grid (e.g., a square grid). For example, the array detector 120 may include 2048×2048 pixels (i.e., 4,194,304 pixels) arranged in a square grid, or 4096×4096 pixels (i.e., 16,777,216 pixels) arranged in a square grid. Each pixel may include a photosensitive area, which may be a square area, e.g., a 10 micron×10 micron area. The center of each pixel may be separated from the centers of adjacent pixels by a distance referred to as the "pixel pitch", which may be greater than or equal to the extent of each pixel. The focal length of the lens 110 and the array detector 120 may be such that the field of view 130 of the combination of the lens 110 and the array detector 120 is a square 19 degrees on a side (i.e., a 19 degree×19 degree square) or it may be larger or smaller (e.g., more than 25 degrees on a side, 20 degrees on a side, 15 degrees on a side, 10 degrees on a side, 5 degrees on a side, or less than 5 degrees on a side).

The image multiplexer 105 may include a plurality of mirrors 125, each reflecting light from a scene being observed into the lens 110 and onto the array detector 120. Each mirror 125 may be controllable to rotate through a small angle about each of two different axes of rotation (as a result of being mounted on a suitable piezoelectric tip-tilt mount, for example). Each mirror 125 may be, in its respective nominal position, in a different orientation from the other mirrors, so that when all of the mirrors 125 are in their respective nominal positions, each mirror reflects into lens 110 and onto the array detector 120 a different field of view 130, i.e., a different portion of the scene being observed. The fields of view 130 may then overlap on the array detector 120, so that each image acquired by the array detector 120 may be a superposition of the fields of view 130. When all of the mirrors 125 are in their respective nominal positions, these fields of view 130 may abut, or overlap slightly, or nearly abut (leaving small gaps between the fields of view 130), so that, for an array of ten mirrors corresponding to a 2×5 array of 19 degree×19 degree fields of view 130 (e.g., two rows of five fields of view 130 each, as shown in FIG. 1), the total field of view covered by the ten fields of view 130 may span 38 degrees (e.g., in elevation) by 95 degrees (e.g., in azimuth). FIG. 1 is not drawn to scale, and, for example, the angles at which rays are reflected from the mirrors 125 are not intended to be accurate.

The angular range of motion of each of the mirrors 125 about each axis may be one that corresponds to a fraction of a pixel on the array detector 120, or to a few pixels (e.g., two pixels) on the array detector 120, or the angular range may be between these two values. For example, for a 2048×2048 array detector 120 and a lens 110 mapping this detector into a 19 degree×19 degree field of view 130, the range of motion of the mirror 125 may be 0.0046 degrees (i.e., 0.0023 degrees in one direction from a nominal position of the mirror 125, and 0.0023 degrees in the other direction from the nominal position of the mirror 125), corresponding to a full range of motion of one pixel (0.0093 degrees) of image motion on the detector 120 (taking into account that the reflected ray is rotated by twice the amount the mirror rotates). As such, each mirror 125 may move, for example, by +/−0.0023 degrees in elevation, and by +/−0.0023 degrees in azimuth, about a nominal position of the mirror 125. Rotating any mirror 125 from its respective nominal position may result in an "image offset" for the field of view 130 reflected by that mirror into the lens 110 and onto the array detector 120, i.e., it may result in offsetting that field of view 130 within the scene.

In operation, the mirrors 125 may be caused to assume different combinations of angles, corresponding to different image offsets. Each such combination may be represented by a vector. For example, for ten mirrors, each controllable to rotate about two axes of rotation, the vector may be a twenty-element vector, with, e.g., the first two elements being the rotation in elevation and azimuth, respectively, of the first mirror, the second two elements being the rotation in elevation and azimuth, respectively, of the second mirror, and so on. A plurality of images may be acquired, each for a different combination of image offsets. If the number of images acquired is equal to the number of mirrors (i.e., to the number of fields of view 130 being superimposed at the array detector 120) and if each image, or "raw image" is acquired with a different combination of image offsets, for which the vectors (e.g., the ten twenty-element vectors) are linearly independent, then it may be possible, using a suitable inversion process, to extract, or "unpack" from the acquired raw images a set of images (or "unpacked images"), with each unpacked image corresponding to a respective field of view 130. Further details of this method may be found in the article entitled "Shift-encoded optically multiplexed imaging", by Shah et al. (Optical Engineering 56(4), 041314 (April 2017)), the contents of which are incorporated herein by reference. The unpacked images may then be tiled together to form a single composite image corresponding to a larger (e.g., 38 degree×95 degree), composite field of view that encompasses each of the plurality of fields of view 130. In this manner, an increased total field of view (i.e., a larger field of view than that corresponding to the size of the array detector 120 and the focal length of the lens 110) may be achieved.

Figure 2:
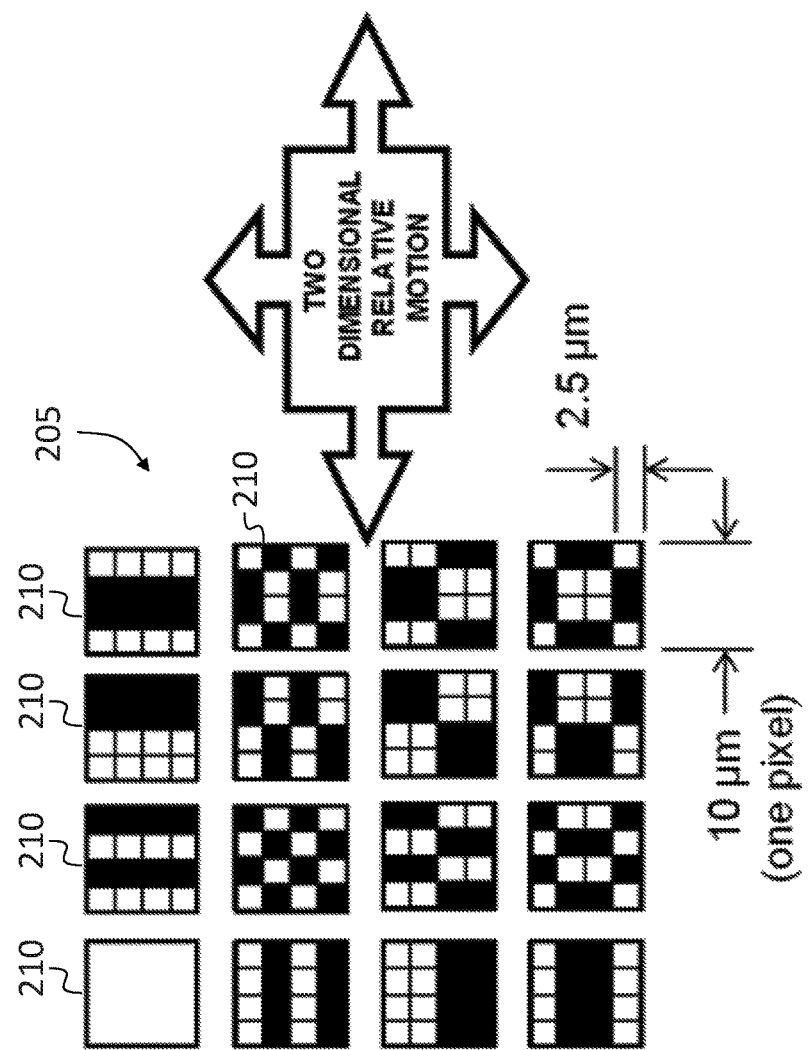
FIG. 2 is a diagram of a portion of a coded mask, according to an embodiment of the present invention.

The coded mask 115 may be employed to improve the resolution of the imaging system. Referring to FIG. 2, the coded mask 115 may include an array of repeating sets of mask patterns 205, each set of mask patterns 205 being a set of individual mask patterns 210. The coded mask 115 may be formed by repeating, for example, the set of mask patterns 205 so that the resulting coded mask 115 is somewhat larger than the array detector 120. Such a coded mask 115 may be suitable for covering each pixel of the array detector 120 with a respective individual mask pattern 210 when the coded mask 115 is in its nominal position, and also when it is translated (as discussed in further detail below) to cause the pixels to be covered by different individual mask patterns 210. The coded mask 115 may be immediately adjacent the array detector 120 (as shown in FIG. 1), each individual mask pattern 210 may have the same dimensions as a pixel of the array detector 120, and the separation between the center of each individual mask pattern 210 and the center of any adjacent individual mask pattern 210 may be equal to the pixel pitch, so that each individual mask pattern 210 covers a respective pixel. In an embodiment in which the pixel pitch is greater than the pixel edge length, gaps may be present between the individual mask patterns 210, as illustrated in FIG. 2.

In operation, the coded mask 115 may be moved across the array detector 120 in two dimensions (by a suitable actuator or set of actuators) and a new image may be acquired for each of a sequence of exposures (e.g., sixteen exposures) each with a different mask position, so that each pixel is exposed once through each of the individual mask patterns 210 during the sequence of exposures. Each individual mask pattern 210 may consist of opaque (e.g., black) squares and transmissive squares (e.g., clear or transparent squares, or square holes in the mask) so that each individual mask pattern 210 (except the entirely clear individual mask pattern 210 at the upper left in FIG. 2, which includes no opaque squares) shades some portions of the pixel that it covers and, elsewhere, allows light to reach the pixel (from the lens 110) substantially unattenuated. Each square of each mask covers a portion of a pixel (e.g., one sixteenth of a pixel, as illustrated in FIG. 2) that may be referred to as a "sub-pixel".

The effect of exposing the pixel to a pattern of light (e.g., the pattern that is formed when an image is projected onto the array detector 120) through an individual mask pattern 210 may be to form a weighted sum of the set of respective intensity (i.e., irradiance) values on the sub-pixels, the weights being (i) one for any clear square in the individual mask pattern 210 and (ii) zero for any opaque square in the individual mask pattern 210. As such, the effect of performing sixteen exposures, one through each of the individual mask patterns 210, may be to form the matrix product of (i) a matrix having, in each row, a vector of ones and zeros corresponding to the clear and opaque squares of a respective one of the individual mask patterns 210 (or a vector of all ones for the individual mask pattern 210 that is entirely clear) and (ii) the vector of subpixel intensities projected onto the region of the pixel (and the individual mask pattern 210) by the lens 110. The vector of intensity measurements resulting from the sequence of exposures may then be multiplied by the inverse of the matrix to obtain the sub-pixel intensities (or, equivalently, and, in some instances more efficiently, the linear system may be solved by another method, e.g., using the LU decomposition of the matrix). In this manner, sub-pixel resolution (i.e., higher resolution than that corresponding to the pixel pitch) may be achieved.

Each set of mask patterns 205 may include the sixteen individual mask patterns 210 shown in FIG. 2 which are related to a 16×16 Hadamard matrix. This set of mask patterns 205 may be referred to as a "4×4 set of Hadamard mask patterns", and the individual mask patterns 210 that form it may be referred to as "individual Hadamard mask patterns" or "individual 4×4 Hadamard mask patterns". In other embodiments, there may be fewer individual mask patterns 210 in each set of mask patterns 205. For example, there may be four 2×2 mask patterns, related to a 4×4 Hadamard matrix. The four 2×2 mask patterns may be the four patterns at the intersections of the first and third rows and the first and third columns of the 4×4 set of mask patterns 205 shown in FIG. 2, which may be referred to as the "2×2 subset of the 4×4 set of Hadamard mask patterns". In an embodiment using a set of sixteen mask patterns (such as those of FIG. 2), a first sub-pixel resolution image may be obtained for each pixel once sixteen exposures have been performed. Another sub-pixel resolution image may then be obtained, in a rolling fashion, for each subsequent exposure (e.g., using the second through seventeenth exposures to obtain a second sub-pixel resolution image). In some embodiments, the individual mask patterns are not Hadamard individual mask patterns but may instead consist of any other set of individual mask patterns that correspond to an invertible matrix, i.e., one whose determinant is non-zero.

The coded mask 115 may be immediately adjacent the array detector 120 (as shown in FIG. 1), or it may instead be positioned at an intermediate image plane if the lens 110 is a compound lens (as illustrated in FIG. 1) and if the lens 110 forms an intermediate image. In this case, the coded mask 115 may be projected onto the array detector 120, and the coded mask 115 may be significantly smaller than the array detector 120 (reducing the range of motion required of the actuators used to move the coded mask 115) or significantly larger than the array detector 120 (reducing the precision required in fabricating the coded mask 115 and in positioning the coded mask 115). In operation, the pattern over (or projected onto) any pixel may be, during any exposure, one of the individual 4×4 Hadamard mask patterns 210 of FIG. 2, or an individual 2×2 Hadamard mask pattern, or any other individual mask pattern selected from a suitable set of mask patterns corresponding to an invertible matrix.

Figure 3:
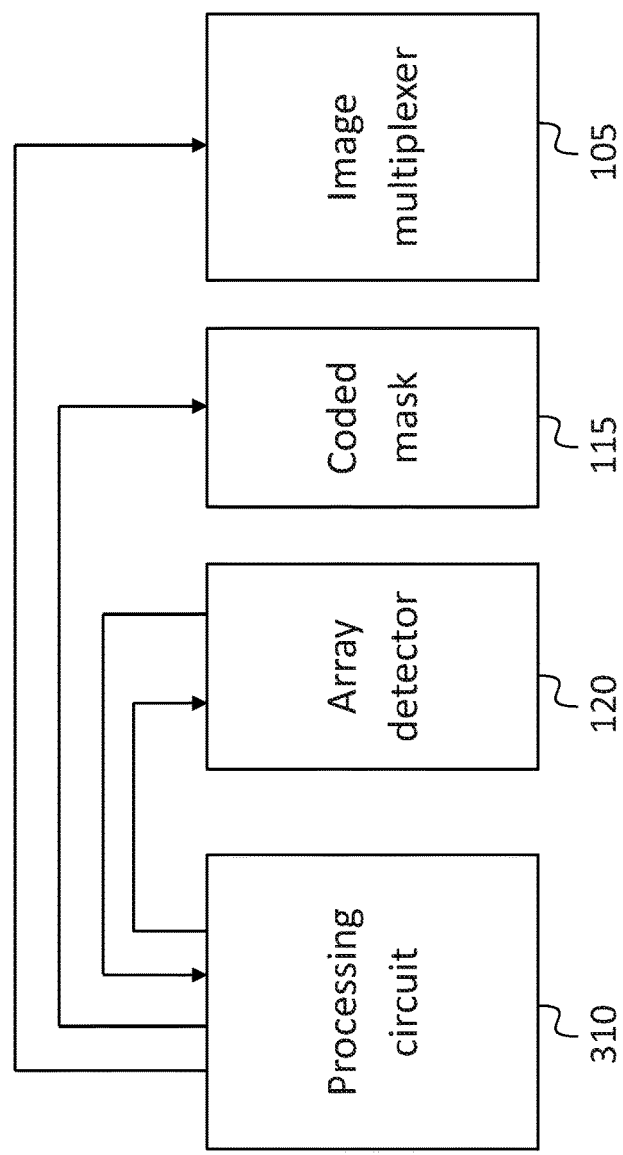
FIG. 3 is a block diagram of a portion of an imaging system, according to an embodiment of the present invention.

Referring to FIG. 3, in some embodiments a processing circuit 310 may be connected to control the coded mask 115 (e.g., by controlling the actuators used for translating the coded mask 115) and to control the image multiplexer 105, and to control and read the array detector 120 (which may include an integrated dewar-electronics-cooler assembly (IDECA)). The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example a processing circuit may include two processing circuits, an FPGA and a CPU, interconnected on a PCB.

Figure 4:
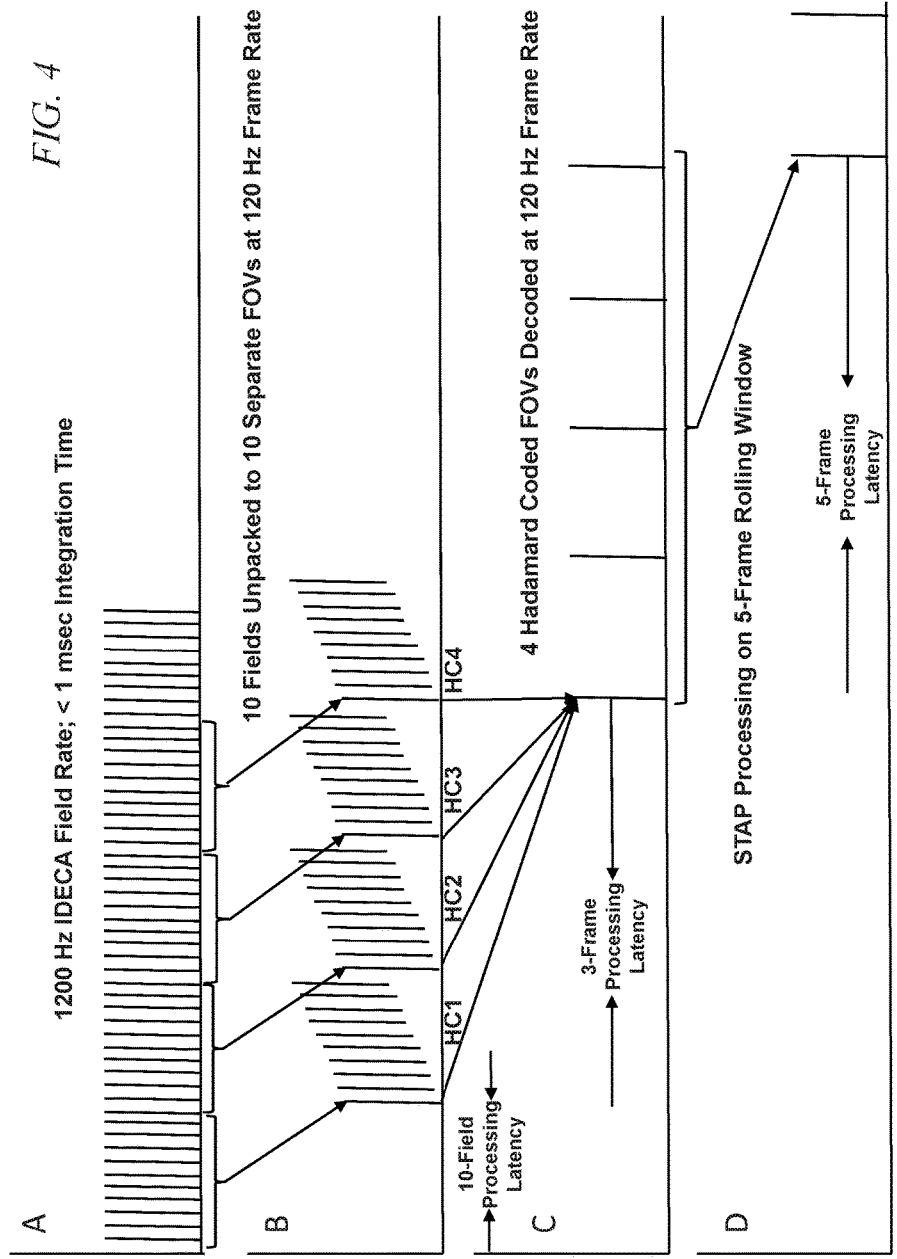
FIG. 4 is a timing diagram, according to an embodiment of the present invention.

FIG. 4 shows a timing diagram, for one embodiment in which individual 2×2 Hadamard mask patterns are used. The timing diagram includes four timelines, labeled A through D from the uppermost timeline through the lowest one. Timeline A shows raw image acquisition, proceeding, for example, at a rate of 1200 Hz, using an integrated dewar-electronics-cooler assembly (IDECA). The first ten images are acquired using the same individual 2×2 Hadamard mask pattern ("HC1"), and each of the first ten images is acquired with a different combination of image offsets (of a set of ten such combinations that are linearly independent, as mentioned above). Once the first set of ten images has been acquired, they are unpacked to form ten separate fields of view. These ten fields of view are illustrated as a set of ten lines, in timeline B, only one of which touches the time axis in timeline B. The gap between nine of the lines and the time axis is intended to show that these images are not separated in time. Instead all ten unpacked images become available simultaneously when the unpacking process is complete. A new set of ten images becomes available after each new set of ten raw images is acquired, e.g., at a rate of 120 Hz, using different 2×2 Hadamard mask patterns ("HC2" through "HC4").

Once the first four sets of ten fields of view are available as illustrated in timeline B, they may be decoded (i.e., a suitable linear system may be solved to obtain sub-pixel resolution images), and, thereafter, each time a new set of unpacked images becomes available, a new set of sub-pixel resolution images is generated after a certain processing latency, in a rolling manner, from the four most recently unpacked sets of ten unpacked images, as illustrated in timeline C. In another embodiment, the Hadamard decoding process is instead performed on a "block" basis, i.e., Hadamard decoding is performed only when four new sets of unpacked images are available; in such an embodiment the rate at which new sets of sub-pixel resolution images become available may be 30 Hz (instead of 120 Hz as indicated in timeline C, for a rolling process). Infrared search and track processing (such as space-time adaptive processing (STAP)) may then be performed after a certain processing latency, e.g., on a five-frame rolling window of sets of sub-pixel resolution images, as shown in timeline D.

In other embodiments, the order of cycling through (i) the combinations (e.g., the ten combinations) of image offsets and (ii) the individual mask patterns may be reversed, and for example (if 4×4 Hadamard mask patterns are used), raw images may be acquired for all sixteen individual mask patterns before the combination of image offsets is changed. In such an embodiment, 160 raw images may be obtained before unpacking of images is performed. The unpacking may be performed after solving for sub-pixel resolution images, or (potentially at lower cost in computation) the unpacking may be performed on sets of ten images each having been acquired for the same mask pattern.

Some embodiments may be of use in various military applications, including tracking of vehicles, vessels, and aircraft. Some embodiments may also be of use in various commercial applications, such as surveying of the ground from aircraft or satellites.

Although limited embodiments of a system and method for optical multiplexing and overlaid subpixel processing have been specifically described and illustrated herein, many modifications and variations will be apparent to those skilled in the art. Accordingly, it is to be understood that a system and method for optical multiplexing and overlaid subpixel processing employed according to principles of this invention may be embodied other than as specifically described herein. The invention is also defined in the following claims, and equivalents thereof.

What is claimed is:

1. A system, comprising:
    an image multiplexer;
    an imaging lens;
    a coded mask;
    an array detector comprising an array of pixels; and
    a processing circuit,
    the imaging lens and the image multiplexer being configured to superimpose a plurality of fields of view onto the array detector,
    the image multiplexer being controllable to shift each field of view by a respective image offset, and
    the coded mask being controllable to shade each of the pixels with a respective individual mask pattern.

2. The system of claim 1, wherein the coded mask is a Hadamard mask.

3. The system of claim 1, wherein the coded mask is immediately adjacent the array detector.

4. The system of claim 1, wherein the imaging lens is a compound lens and the coded mask is at an intermediate image plane of the imaging lens.

5. The system of claim 1, wherein the processing circuit is configured:
    in a first operation:
        to control the image multiplexer to produce a first combination of image offsets,
        to control the coded mask to shade a first pixel of the array of pixels with a first individual mask pattern,
        to acquire, from the array detector, a first image with the first combination of image offsets, and with the first individual mask pattern shading the first pixel;
    in a second operation:
        to control the image multiplexer to produce a second combination of image offsets,
        to control the coded mask to shade the first pixel with the first individual mask pattern,
        to acquire, from the array detector, a second image with the second combination of image offsets, and with the first individual mask pattern shading the first pixel;
    in a third operation:
        to control the image multiplexer to produce the first combination of image offsets,
        to control the coded mask to shade the first pixel with a second individual mask pattern, to acquire, from the array detector, a third image with the first combination of image offsets, and with the second individual mask pattern shading the first pixel; and in a fourth operation, to generate, from a plurality of images including the first image, the second image, and the third image, an enhanced-resolution image encompassing the plurality of fields of view.

6. The system of claim 5, wherein the coded mask is a Hadamard mask.

7. The system of claim 5, wherein the coded mask is immediately adjacent the array detector.

8. The system of claim 5, wherein the imaging lens is a compound lens and the coded mask is at an intermediate image plane of the imaging lens.

9. The system of claim 5, wherein the processing circuit is configured:
to perform the first operation before the second operation;
to perform the second operation before the third operation; and
to perform the third operation before the fourth operation.

10. The system of claim 5, wherein the processing circuit is configured:
to perform the second operation before the first operation;
to perform the first operation before the third operation; and
to perform the third operation before the fourth operation.

11. A method for forming images, the method comprising:
acquiring, with an imaging system, a plurality of raw images including a first image, a second image, and a third image;
generating, from the plurality of raw images, an enhanced-resolution image encompassing a plurality of fields of view,
the imaging system comprising:
an image multiplexer;
an imaging lens;
a coded mask;
an array detector comprising an array of pixels; and
a processing circuit,
the imaging lens and the image multiplexer being configured to superimpose the plurality of fields of view onto the array detector,
the image multiplexer being controllable to shift each field of view by a respective image offset,
the coded mask being controllable to shade each of the pixels with a respective individual mask pattern,
the acquiring the plurality of raw images comprising:
in a first operation:
controlling the image multiplexer to produce a first combination of image offsets,
controlling the coded mask to shade a first pixel of the array of pixels with a first individual mask pattern,
acquiring, from the array detector, a first image with the first combination of image offsets, and with the first individual mask pattern shading the first pixel;
in a second operation:
controlling the image multiplexer to produce a second combination of image offsets,
controlling the coded mask to shade the first pixel with the first individual mask pattern,
acquiring, from the array detector, a second image with the second combination of image offsets, and with the first individual mask pattern shading the first pixel; and
in a third operation:
controlling the image multiplexer to produce the first combination of image offsets,
controlling the coded mask to shade the first pixel with a second individual mask pattern,
acquiring, from the array detector, a third image with the first combination of image offsets, and with the second individual mask pattern shading the first pixel.

12. The method of claim 11, wherein the coded mask is a Hadamard mask.

13. The method of claim 11, wherein the coded mask is immediately adjacent the array detector.

14. The method of claim 11, wherein the imaging lens is a compound lens and the coded mask is at an intermediate image plane of the imaging lens.

15. The method of claim 11, wherein:
the first operation is performed before the second operation;
the second operation is performed before the third operation; and
the third operation is performed before the generating the enhanced-resolution image.

16. The method of claim 11, wherein:
the second operation is performed before the first operation;
the first operation is performed before the third operation; and
the third operation is performed before the generating the enhanced-resolution image.

17. A method for forming images using an imaging system having an image multiplexer, an imaging lens, a coded mask, an array detector with an array of pixels, and a processing circuit, the method comprising:
acquiring, with the imaging system, a plurality of raw images including a first image, a second image, and a third image;
generating, from the plurality of raw images, an enhanced-resolution image encompassing a plurality of fields of view;
superimposing, using the imaging lens and the image multiplexer, the plurality of fields of view onto the array detector;
using the processing circuit, controlling the image multiplexer to shift each field of view by a respective image offset;
using the processing circuit, controlling the coded mask to shade each of the pixels with a respective individual mask pattern; and
using the processing circuit, generating, from the first image, the second image, and the third image, the enhanced-resolution image encompassing the plurality of fields of view.

* * * * *